US008289744B2

(12) United States Patent
Takahashi et al.

(10) Patent No.: US 8,289,744 B2
(45) Date of Patent: Oct. 16, 2012

(54) POWER SUPPLY UNIT, IMAGE FORMING APPARATUS, AND METHOD FOR CONTROLLING POWER SUPPLY

(75) Inventors: Hiroyuki Takahashi, Kanagawa (JP); Eiji Nemoto, Tokyo (JP); Hiroki Ohkubo, Kanagawa (JP); Yuji Matsuda, Tokyo (JP); Yusuke Ozaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 409 days.

(21) Appl. No.: 12/241,770

(22) Filed: Sep. 30, 2008

(65) Prior Publication Data

US 2009/0091959 A1 Apr. 9, 2009

(30) Foreign Application Priority Data

Oct. 3, 2007 (JP) ................................ 2007-260082
Aug. 29, 2008 (JP) ................................ 2008-222236

(51) Int. Cl.
*H02M 7/12* (2006.01)
*H02M 7/155* (2006.01)
*H02M 7/08* (2006.01)

(52) U.S. Cl. ........................ 363/126; 363/21.13; 363/97

(58) Field of Classification Search ............... 363/21.12, 363/21.13, 21.14, 21.15, 21.18, 97
See application file for complete search history.

(56) References Cited

U.S. PATENT DOCUMENTS 6,134,130 A * 10/2000 Connell et al. .................. 363/89
2004/0228049 A1* 11/2004 Chae et al. ...................... 361/18

FOREIGN PATENT DOCUMENTS

| | | |
|---|---|---|
| JP | 2001-69687 | 3/2001 |
| JP | 2002-139586 | 5/2002 |
| JP | 2003-29579 | 1/2003 |
| JP | 2003-153467 | 5/2003 |
| JP | 2005-354888 | 12/2005 |

* cited by examiner

*Primary Examiner* — Bao Q Vu
*Assistant Examiner* — Nusrat Quddus
(74) *Attorney, Agent, or Firm* — Oblon, Spivak, McClelland, Maier & Neustadt, L.L.P.

(57) ABSTRACT

In an image forming apparatus, a monitoring unit monitors whether a returning factor required to switch an operational state of the apparatus from a power-saving mode to an operating mode is generated, an antenna unit receives external electrical wave, a power generation unit generates electricity from the received electrical wave and supplies the electricity to the monitoring unit, and a controlling unit switches the operational state of the apparatus from the power-saving mode to the operating mode when the monitoring unit detects generation of a returning factor.

18 Claims, 8 Drawing Sheets

POWER SUPPLY UNIT, IMAGE FORMING APPARATUS, AND METHOD FOR CONTROLLING POWER SUPPLY

CROSS-REFERENCE TO RELATED APPLICATIONS

The present application claims priority to and incorporates by reference the entire contents of Japanese priority document 2007-260082 filed in Japan on Oct. 3, 2007 and Japanese priority document 2008-222236 filed in Japan on Aug. 29, 2008.

BACKGROUND OF THE INVENTION

1. Field of the Invention

The present invention relates to a power supply unit and an image forming apparatus.

2. Description of the Related Art

Many electric apparatuses have a power-saving mode for saving electricity. For example, generally, an image forming apparatus has three modes: power off mode, standby mode; and sleep mode. In the power off mode, the main power switch is turned off and no power is supplied to the apparatus. In the standby mode, the main power switch is on, whereby an alternating current (AC) power is supplied to the apparatus and an image can be formed immediately by driving mechanical loads with a motor clutch and the like by generating a direct current (DC) power of 5 V (volt), 24 V, and the like used therein.

The apparatus enters the sleep mode when the apparatus is not operated for a certain period of time, or when an instruction is received from the user. In the sleep mode, power is supplied only to certain specific units in the apparatus and power supply to other units in the apparatus is cutoff. Thus, the power consumption is reduced. The apparatus switches to the standby mode from the sleep mode when a return sensor output and a host interface (I/F) is connected to the units supplied with power and a change in an output condition of the sensor output or a signal condition of the host I/F is detected. Specifically, the apparatus under the sleep mode switches to the standby mode and starts printing when the user instructs the apparatus copy or document reading, the apparatus receives an instruction for printing from an external host such as a local area network (LAN) and a universal serial bus (USB), and when the apparatus receives a fax.

An outline of a configuration of a conventional image forming apparatus that performs such an operation is explained with reference to a block diagram in FIG. 7. As shown in FIG. 7, the conventional image forming apparatus includes an AC plug 1001, an AC switch 1002, a power supply unit 1004, a mechanical controlling unit 1005, a mechanical load controlling unit 1006, a system controlling unit 1007, an image reading unit 1008, an image writing unit 1009, a host 1010, and a return sensor 1011.

When the AC plug 1001 is connected to an AC outlet and the AC switch 1002 is closed (turned on), an AC power is supplied to the power supply unit 1004. The power supply unit 1004 generates DC powers of 24 V, 5 V, and the like. The DC power is supplied to the mechanical controlling unit 1005, the system controlling unit 1007, and the like via a switch SW1 for 24 V and a switch SW2 for 5 V.

The mechanical load controlling unit 1006 includes a central processing unit (CPU) and an input-output (IO) control driver (not shown). The CPU starts upon power supply and drives mechanical loads in a predetermined image-forming sequence.

The image reading unit 1008 includes a lamp and a charge-coupled device (CCD) (not shown) and reads an image of an original by irradiating the original on a platen with light and receiving the reflected light with the CCD.

The system controlling unit 1007 operates in synchronization with the mechanical controlling unit 1005 when the apparatus performs copying. The system controlling unit 1007 reads image data from the image reading unit 1008, and after performing various imaging processing, sends the image data to the image writing unit 1009.

The image writing unit 1009 controls on and off of laser diodes in accordance with the image data received from the system controlling unit 1007 to irradiate a photoreceptor drum with a laser beam for forming an electrostatic latent image thereon. The electrostatic latent image formed on the drum is developed with a toner and image forming is completed by copying the toner image on to paper. The process of copying an image formed on the drum on to paper is not a subject matter of the invention. Thus, the detailed explanation of the process is omitted.

The system controlling unit 1007 is connected to the host 1010 through an interface such as a LAN and a USB. When printing, the system controlling unit 1007 performs imaging processes including zoom in/out, and arranging layouts of the image data received from the host 1010 and sends the data to the image writing unit 1009. The image writing unit 1009 performs the similar processes to form the image the user requires.

The power supply unit 1004 includes one switch for each of the outputs 24 V and 5 V. Those switches can be turned on and off in accordance with a PON_ENG signal output from the system controlling unit 1007. The system controlling unit 1007 is supplied with a DC power 5 VE before switching while the mechanical controlling unit 1005 that consumes more electricity is supplied with DC power of 5 V and 24 V after switching.

The return sensor 1011 including a power switch on a control panel, an original set detecting sensor, and a pressure plate opening/closing detecting sensor (not shown) is connected to the system controlling unit 1007. When the apparatus is under the sleep mode, the system controlling unit 1007 constantly monitors an output from the return sensor 1011 to decide whether the user has operated the apparatus. Similarly, the system controlling unit 1007 constantly monitors whether an instruction to print is input from the host 1010, and whether a fax is received.

The system controlling unit 1007 sets the level of the PON_ENG to a logical high level when a returning factor from the return sensor 1011 or the host 1010 is detected. The operation is caused by an input of a certain signal from the return sensor 1011 or the host 1010. The power supply unit 1004 is switched on when it receives the PON_ENG from the system controlling unit 1007. Consequently, power of 5 V and 24 V is supplied to the mechanical controlling unit 1005 from the power supply unit 1004 and the operational state of the apparatus switches (returns) to a mode capable of forming an image.

On the other hand, the system controlling unit 1007 switches off the power supply unit 1004 by setting the level of the PON_ENG to a logical low level when the unit detects that the apparatus has not been operated for a certain period of time or the user has instructed the apparatus to enter the sleep mode using the control keys. The apparatus can switch to the sleep mode by negating the PON_ENG to cut off the power of 24 V and 5 V supplied to the mechanical controlling unit 1005.

FIG. 8 is a timing chart of these operations. When the AC switch is turned on ("power sw on"), an AC power is supplied to the power supply unit 1004 and an oscillation circuit (not shown) starts to oscillate ("oscillation circuit output"). A DC voltage generator generates a 5 VE ("5 VE") as a secondary voltage by transforming and rectifying the output of the oscillation circuit ("DC voltage output"). When the 5 VE is supplied to the system controlling unit 1007, a CPU in the system controlling unit 1007 starts and the PON_ENG ("PON_ENG") is asserted. Upon assertion of the PON_ENG, the SW1 and the SW2 in the power supply unit 1004 are switched on and the 5 V and 24 V outputs ("power for mechanical control") are supplied to the mechanical controlling unit 1005. Consequently, the system starts and the apparatus enters a standby mode ("standby").

When a timer in the system controlling unit 1007 detects that the apparatus has not been operated for a certain period of time ("timer up"), the PON_ENG ("PON_ENG") is negated to cut off the 5 V and 24 V outputs and the apparatus enters the sleep mode ("sleep mode"). Under the sleep mode, the CPU in the system controlling unit 1007 constantly monitors the return sensor 1011 and when it is detected that, for example, the user has operated the image forming apparatus, the PON_ENG ("PON_ENG") is asserted again to turn on the 5 V and 24 V outputs. Consequently, the image forming apparatus is started, that is, the apparatus again enters the standby mode.

With the above-described configuration and functions, the power consumption of the conventional image forming apparatus is reduced by automatically causing the apparatus to enter the sleep mode when the apparatus has not been operated for a certain period of time, and automatically return when the apparatus detects a signal for returning such as a return sensor output and an access signal from the host 1010.

Japanese Patent Application Laid-open No. 2001-69687, for example, teaches use of solar batteries as the power source in the sleep mode has been proposed to further reduce the power consumption when the apparatus is under the sleep mode. As explained, for the apparatus to automatically return to the standby mode, the return sensor 1011 and the system controlling unit 1007 must partly be supplied with power when the apparatus is under the sleep mode. A technique disclosed in Japanese Patent Application Laid-open No. 2001-69687 further reduces the power consumption by using a solar battery to supply power to part of the return sensor 1011 and the system controlling unit 1007 in an example arrangement illustrated in FIG. 7.

An example of a configuration of a conventional power supply unit using a solar battery as a power source is shown in FIG. 9. When the apparatus is in the normal operating mode, a charge circuit 1110 supplies a voltage output 2 from a DC power supply circuit 1105 to a monitoring circuit 1104 and a detecting circuit 1103 that detects a returning factor, and charges a storage battery 1111. When the apparatus is in the low-power consumption mode, the storage battery 1111 supplies the voltage output 2 to the monitoring circuit 1104 and the detecting circuit 1103. In the low-power consumption mode, the charge circuit 1110 charges the storage battery 1111 only when light is falling on a solar battery 1113. Thus, the power supply unit can cut off the voltage output 2 when the storage battery 1111 discharges for a certain amount and a power threshold detecting circuit 1112 detects that the voltage has fallen below a certain threshold.

When power switching circuits 1107 and 1108 are closed, an AC power is supplied to the DC power supply circuit 1105. The DC power supply circuit 1105 supplies a voltage output

1 to a controlling circuit 1106. The controlling circuit 1106 controls the apparatus in the normal operation mode.

When switching to the low-power consumption mode, the controlling circuit 1106 sends a signal to the DC power supply circuit 1105 to stop the output. Upon receiving the signal, the DC power supply circuit 1105 stops the voltage output 1 and the controlling circuit 1106 stops controlling the apparatus. In the low-power consumption mode, the storage battery 1111 supplies the voltage output 2 to the monitoring circuit 1104 and the detecting circuit 1103.

Under the low-power consumption mode, when the detecting circuit 1103 detects any returning factor, a signal is sent to the monitoring circuit 1104. The DC power supply circuit 1105 supplies the voltage output 1 to the controlling circuit 1106 and the controlling circuit 1106 switches the apparatus to the normal operation mode from the low-power consumption mode.

In the example of this conventional power supply unit, when the power threshold detecting circuit 1112 detects that the voltage of the storage battery 1111 has fallen below a certain threshold, the power from the storage battery 1111 to the detecting circuit 1103 and the monitoring circuit 1104 is cut off and the apparatus is turned off. Thus, after the power is off, the sleep mode, in which the apparatus can return to the normal operation mode upon receiving any returning factor, cannot be maintained.

The power shortage of a power source charged by the solar battery in the low-power consumption mode may be compensated by activating the main power supply to charge the storage battery. However, to do so, the load increases and as a result, the power consumption increases.

To solve these problems, Japanese Patent Application Laid-open No. 2003-29579, for example, discloses an image forming apparatus including a main power supply, a solar battery, a secondary battery charged by the main power supply or the solar battery, and a controlling unit that stops the operation of the main power supply and supplies power to units in the apparatus using the secondary battery in the low-power consumption mode. This apparatus includes a power supply threshold detecting unit that monitors the level of the secondary battery. In the low-power consumption mode, when the power supply threshold detecting unit detects that the voltage of the secondary battery has fallen below a certain threshold, the controlling unit blocks paths for supplying power to units in the apparatus. Thus, load on the secondary battery is reduced and a long low-power consumption mode using the secondary battery as the power source can be maintained.

As another way of generating power other than solar batteries, Japanese Patent Application Laid-open No. 2005-354888, for example, discloses electric wave power generation that generates power from electric waves in a living space.

The techniques disclosed in Japanese Patent Application Laid-open No. 2001-69687 and Japanese Patent Application Laid-open No. 2003-29579 use solar batteries. Therefore, power cannot be generated unless the apparatus receives light. The storage battery is used to supply power to the apparatus under the sleep mode in an environment without light in Japanese Patent Application Laid-open No. 2001-69687 and Japanese Patent Application Laid-open No. 2003-29579. However, as the storage battery discharges, the voltage thereof decreases and the voltage may drop to a level that power needed to maintain the sleep mode cannot be supplied. The technique disclosed in Japanese Patent Application Laid-open No. 2003-29579 includes a power supply threshold detecting unit to block paths for supplying power to units in the apparatus when the power supply threshold detecting unit detects that voltage of the storage battery has fallen below a certain threshold. However, in this case, the power of the apparatus is turned off and the sleep mode, in which the apparatus can return to the normal operation mode upon receiving any returning factor, cannot be maintained.

The object of the technique disclosed in Japanese Patent Application Laid-open No. 2005-354888 is electric wave power generation. The technique is not related to using the electric wave power generation in a complementary style with a commercial AC power supply to reduce consumption of the commercial AC power supply in the low-power consumption mode.

SUMMARY OF THE INVENTION

It is an object of the present invention to at least partially solve the problems in the conventional technology.

According to an aspect of the present invention, there is provided a power supply unit that includes a power supply; a controlling unit configured to switch an operational state of an apparatus from an operating mode in which the power supply supplies a first-level power to the apparatus to a power-saving mode in which the power supply supplies a second-level power that is lower than the first-level power to the apparatus and vise-versa; a monitoring unit that monitors whether a returning factor required to switch the operational state of the apparatus from the power-saving mode to the operating mode is generated; an antenna unit that receives external electrical wave; and a power generation unit that generates electricity from the received electrical wave and supplies the electricity to the monitoring unit. The controlling unit switches the operational state of the apparatus from the power-saving mode to the operating mode when the monitoring unit detects generation of a returning factor.

According to another aspect of the present invention, there is provided an image forming apparatus that includes at least one of a printer engine and a scanner engine; and a power supply unit. The power supply unit includes a power supply; a controlling unit configured to switch an operational state of the image forming apparatus from an operating mode in which the power supply supplies a first-level power to the image forming apparatus to a power-saving mode in which the power supply supplies a second-level power that is lower than the first-level power to the image forming apparatus and vise-versa; a monitoring unit that monitors whether a returning factor required to switch the operational state of the image forming apparatus from the power-saving mode to the operating mode is generated; an antenna unit that receives external electrical wave; and a power generation unit that generates electricity from the electrical wave and supplies the electricity to the monitoring unit. The controlling unit switches the operational state of the image forming apparatus from the power-saving mode to the operating mode when the monitoring unit detects generation of a returning factor.

According to still another aspect of the present invention, there is provided a method for controlling power supply to an apparatus from a power supply. The method includes monitoring with a monitoring unit whether a returning factor required to switch an operational state of the apparatus from a power-saving mode to an operating mode is generated, the operating mode being a state in which the power supply supplies a first-level power to the apparatus and the power-saving mode being a state in which the power supply supplies a second-level power that is lower than the first-level power to the apparatus; generating electricity from electrical wave received at an antenna; supplying the electricity generated at the generating to the monitoring unit; and switching the operational state of the apparatus from the power-saving mode to the operating mode when the monitoring unit detects generation of a returning factor.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described hereinbelow in detail with reference to the accompanying drawings.

Figure 1:
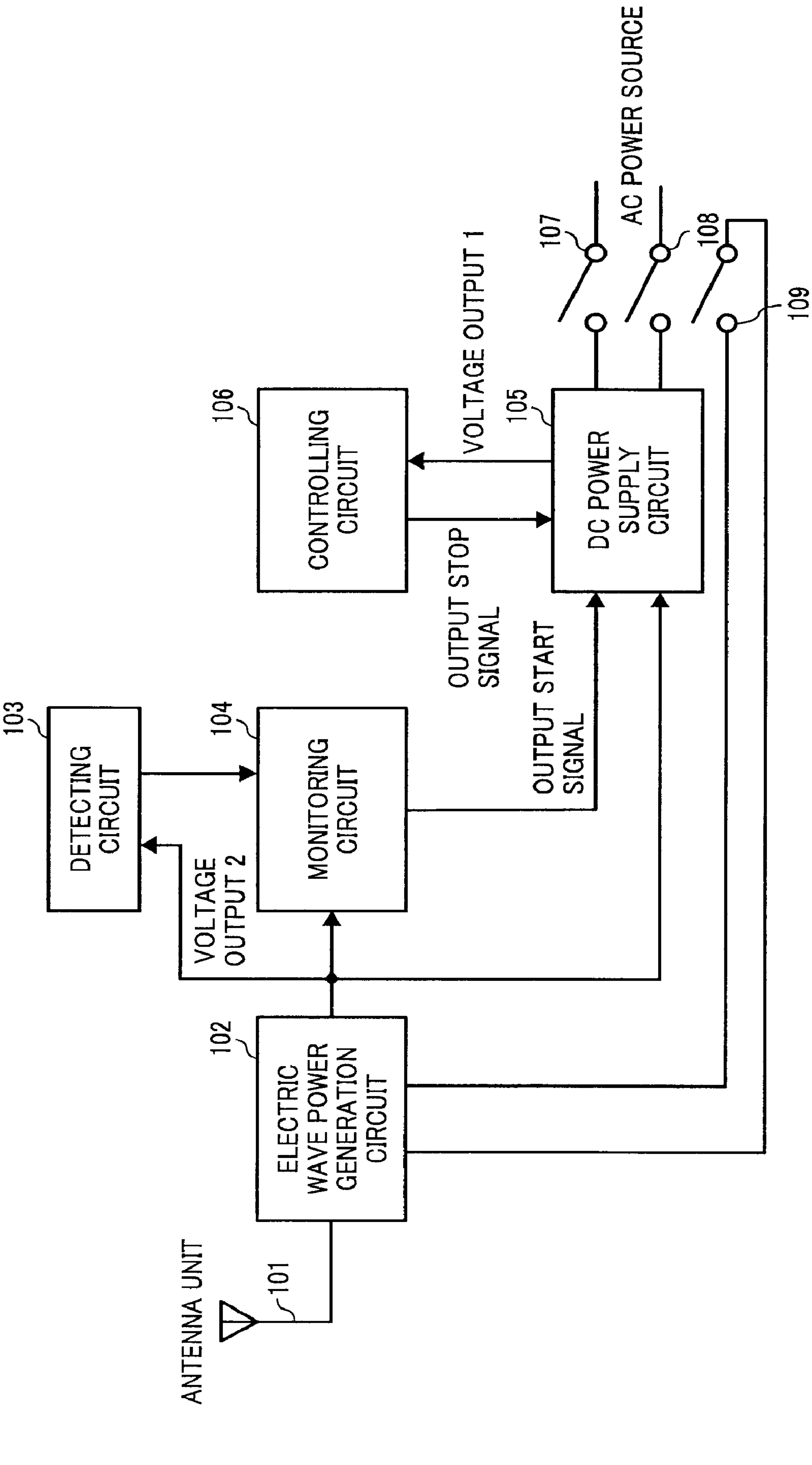
FIG. 1 is a block diagram of a power supply unit according to an embodiment of the present invention.

FIG. 1 is a block diagram of a power supply unit according to an embodiment of the present invention. As shown in FIG. 1, the power supply unit includes an antenna unit 101; an electric wave power generation circuit 102 as a reserve power source; a monitoring circuit 104; a detecting circuit 103; a controlling circuit 106; a DC power supply circuit 105; power switch circuits 107, 108, 109; and an AC power source.

The antenna unit 101 receives electric waves in a living space emitted from a radio, a television set, or the like. The electric wave power generation circuit 102 coverts electric waves received by the antenna unit 101 using a tuning circuit 301, a detector circuit 302, and a voltage stabilizing circuit 228 all shown in FIG. 3.

The electric wave power generation circuit 102 serves as a reserve power source to supplement the DC power supply circuit 105 as a main power source explained below. Specifically, the electric wave power generation circuit 102 supplies the voltage output 2 to the detecting circuit 103 that detects a returning factor for the apparatus to return from the low-power consumption mode and outputs a detection signal, the monitoring circuit 104, and the DC power supply circuit 105. Supply of the voltage output 2 is controlled by switching actions of the power switch circuit 109.

Switching actions of the power switch circuits 107 and 108 control the connection between the AC power source and the DC power supply circuit 105. When the power switch circuits 107 and 108 are closed, the AC power source and the DC power supply circuit 105 are connected and power is supplied from the AC power source to the DC power supply circuit 105. When the power switch circuits 107 and 108 are opened, the AC power source and the DC power supply circuit 105 are disconnected and power is not supplied from the AC power source to the DC power supply circuit 105.

Switching actions of the power switch circuit 109 are in combination with the switching actions of the power switch circuits 107 and 108. That is, when the power switch circuits 107 and 108 are opened and the AC power source and the DC power supply circuit 105 are disconnected, the power switch circuit 109 is also opened, and thus the electric wave power generation circuit 102 stops supplying the voltage output 2 to the detecting circuit 103, the monitoring circuit 104, and the DC power supply circuit 105.

On the other hand, when the power switch circuits 107 and 108 are closed and the AC power source and the DC power supply circuit 105 are connected, the power switch circuit 109 is also closed and the electric wave power generation circuit 102 supplies the voltage output 2 to the detecting circuit 103, the monitoring circuit 104, and the DC power supply circuit 105.

When the voltage output 2 is supplied, the monitoring circuit 104 sends an output start signal to the DC power supply circuit 105 with a capacitor-resistor (CR) time constant circuit not shown.

The DC power supply circuit 105 is the main power source of the apparatus and supplies the voltage output 1 to the controlling circuit 106. More specifically, the DC power supply circuit 105 supplies the voltage output 1 to the controlling circuit 106 upon receiving the output start signal from the monitoring circuit 104. On the other hand, the DC power supply circuit 105 stops supplying the voltage output 1 to the controlling circuit upon receiving an output stop signal from the controlling circuit 106.

The controlling circuit 106 switches the operational state of the apparatus to which the power supply unit supplies power between the normal operation mode and the low-power consumption mode. Specifically, the apparatus operates in the normal operation mode when the voltage output 1 is supplied to the controlling circuit 106 from the DC power supply circuit 105. When the controlling circuit 106 receives information for returning explained below from the monitoring circuit 104, the controlling circuit 106 sends the output stop signal to the DC power supply circuit 105 to change the operational state of the apparatus to the low-power consumption mode from the normal operation mode.

When the apparatus is in the normal operation mode, the power supply unit supplies the apparatus with enough power to operate. That is, the apparatus subjected to power supply is operating. When the apparatus is in the low-power consumption mode, power supply to the apparatus from the DC power supply circuit 105 is partly or completely cut off. Therefore, the low-power consumption mode is a power-saving mode, since power supplied from the DC power supply circuit 105 is smaller than in the normal operation mode where the apparatus is operating.

When switching to the low-power consumption mode, the DC power supply circuit 105 stops supplying the voltage output 1 to the controlling circuit 106 and the controlling circuit 106 stops controlling units. However, as long as the power switch circuit 109 is closed, electrical waves received by the antenna unit 101 supply energy to the electric wave power generation circuit 102 and the electric wave power generation circuit 102 continues to supply the voltage output 2 to the detecting circuit 103, the monitoring circuit 104, and the DC power supply circuit 105. That is, the electric wave power generation circuit 102 continues to supply power to the detecting circuit 103, the monitoring circuit 104, and the DC power supply circuit 105 even when the apparatus is in the low-power consumption (power saving) mode.

The detecting circuit 103 detects an operation of the apparatus subjected to power supply that is a returning factor for the apparatus to return from the low-power consumption mode to the normal operation mode and outputs the detection signal to the monitoring circuit 104.

When the apparatus supplied with power from the power supply unit is in the low-power consumption mode, the monitoring circuit 104 monitors whether the returning factor required for the apparatus to switch to the normal operation mode from the low-power consumption mode is generated. Specifically, when the monitoring circuit 104 receives the detection signal from the detecting circuit 103, based on the signal, the monitoring circuit 104 sends the output start signal to the DC power supply circuit 105. The DC power supply circuit 105 supplies the voltage output 1 to the controlling circuit 106 upon receiving the signal and the controlling circuit 106 switches the operational state of the apparatus from the low-power consumption mode to the normal operation mode. Accordingly, the output start signal serves as a mode switching signal instructing the apparatus to switch from the low-power consumption (power-saving) mode to the normal operation (operating) mode.

As explained above, the power supply unit of the present embodiment supplies power needed to operate the detecting circuit 103, the monitoring circuit 104, and the DC power supply circuit 105, when the apparatus supplied with power from the power supply unit is in the low-power consumption mode using only the electric wave power generation that generates power from the electrical waves in the living space emitted from a radio, television, or the like. That is, the power is supplied to circuits needed to be in operation for the apparatus to automatically switch from the power-saving mode to the operating mode such as the circuits that output the mode switching signal instructing the apparatus to switch from the low-power consumption mode to the normal operation mode not from the main power source (the DC power supply circuit 105) but from the reserve power source (the electric wave power generation circuit 102). With this configuration, the power source in the low-power consumption mode can be configured without a storage battery, the low-power consumption mode can be maintained unlimitedly, and power consumption of the commercial AC power supply can be reduced to almost zero.

Figure 2:
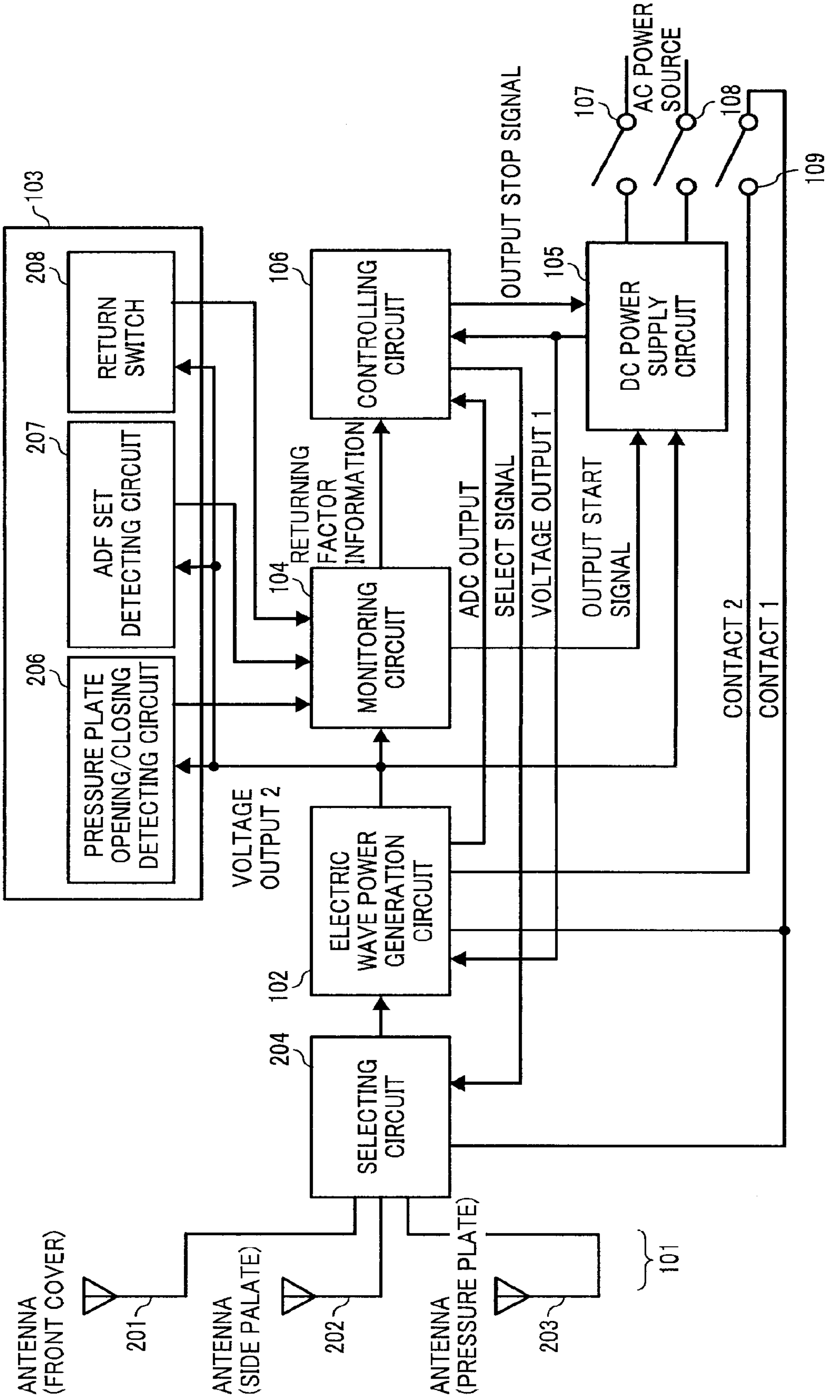
FIG. 2 is a block diagram of a functional structure of an image forming apparatus according to an embodiment of the present invention.

Next, a case where the embodiment of the present invention is applied to an image forming apparatus including a copier, a printer, a facsimile, a scanner, and a multi-function printer having the copy function, the printing function, the facsimile function, and the scanning function is explained. That is, in the following, an apparatus supplied with power from the power supply unit is the image forming apparatus. FIG. 2 is a block diagram of a functional configuration of the image forming apparatus according to the embodiment.

As shown in FIG. 2, the image forming apparatus according to the embodiment includes each circuit in the power supply unit explained with reference to FIG. 1. The image forming apparatus according to the present embodiment further includes a printer and a scanner not shown. In FIG. 2, the antenna unit 101 includes antennas 201, 202, and 203 respectively provided on a front cover, and side plate of the image forming apparatus, and a pressure plate of the scanner. Since the surfaces of the front cover, the side plate, and the pressure plate face different directions, the antennas can have direction characteristics, and the antennas generating the most amount of energy (specifically the energy generated from the antennas) can be chosen with a selecting circuit 204. In other words, each antenna is disposed to receive electrical waves from different directions. Details of the selecting process will be explained later.

Electrical waves received by the antenna unit 101 are converted to the voltage output 2 in the electric wave power generation circuit 102. The voltage output 2 is supplied to a pressure plate opening/closing detecting circuit 206, an automatic-document-feeder (ADF) set detecting circuit 207, and a return switch 208, serving as the detecting circuit 103.

The pressure plate opening/closing detecting circuit 206 detects an opening condition of the pressure plate. When the image forming apparatus is in the low-power consumption mode, the pressure plate opening/closing detecting circuit 206 sends a detection signal indicating that the pressure plate is opened to the monitoring circuit 104 upon detecting that the pressure plate is opened. Upon receiving the signal, the monitoring circuit 104 determines that a returning factor for the apparatus to return from the low-power consumption mode to the normal operation mode is generated.

The ADF set detecting circuit 207 detects whether an original is set to an automatic document feeder (ADF). When the image forming apparatus is in the low-power consumption mode, the ADF set detecting circuit 207 sends a detection signal indicating that an original is set to the ADF to the monitoring circuit 104 upon detecting that the original is set to the ADF. Upon receiving the signal, the monitoring circuit 104 determines that a returning factor for the apparatus to return from the low-power consumption mode to the normal operation mode is generated.

The return switch 208 is operated by the user. When the image forming apparatus is in the low-power consumption mode, if the return switch 208 is pressed, the return switch 208 sends a detection signal indicating that the return switch 208 is pressed to the monitoring circuit 104. Upon receiving the signal, the monitoring circuit 104 determines that a returning factor for the apparatus to return from the low-power consumption mode to the normal operation mode is generated.

Returning factors of the image forming apparatus are not limited to the above-mentioned factors. For example, the image forming apparatus can be configured to regard receiving a fax, or a printing instruction from a computer as the returning factor.

The voltage output 2 is also supplied to the monitoring circuit 104 and the DC power supply circuit 105. The power switch circuit 109 operates in combination with the power switch circuits 107 and 108 and stops supplying the voltage output 2 when the apparatus is disconnected to the AC voltage. Thus, the monitoring circuit 104, the DC power supply circuit 105, and the detecting circuits 103 can be protected from breaking due to the supply of the voltage output 2 thereto when the main power of the image forming apparatus is off.

The AC power is supplied to the DC power supply circuit 105 when the power switch circuits 107 and 108 are closed. The DC power supply circuit 105 generates the voltage output 1 upon receiving the output start signal from the monitoring circuit 104 and stops generating the voltage output 1 upon receiving the output stop signal from the controlling circuit 106.

When the power switch circuit 109 closes in combination with the power switch circuits 107 and 108, the electric wave power generation circuit 102 supplies the voltage output 2 to the pressure plate opening/closing detecting circuit 206, the ADF set detecting circuit 207, the return switch 208, the monitoring circuit 104, and the DC power supply circuit 105. When the voltage output 2 is supplied, the monitoring circuit 104 sends the output start signal to the DC power supply circuit 105 by the CR time constant circuit not shown. The DC power supply circuit 105 supplies the voltage output 1 to the controlling circuit 106 and the controlling circuit 106 controls the apparatus in the normal operation mode.

When the apparatus switches from the normal operation mode to the low-power consumption mode, the controlling circuit 106 sends the output stop signal to the DC power supply circuit 105. In response, the DC power supply circuit 105 stops supplying the voltage output 1 to the controlling circuit 106, and the controlling circuit 106 stops controlling the image forming apparatus. As long as the power switch circuit 109 is closed, electrical waves received by the antennas 201, 202, and 203 are supplied to the electric wave power generation circuit 102 and the electric wave power generation circuit 102 continues to supply the voltage output 2 to the pressure plate opening/closing detecting circuit 206, the ADF set detecting circuit 207, the return switch 208, the monitoring circuit 104, and the DC power supply circuit 105.

When the image forming apparatus is in the low-power consumption mode, if any one of the pressure plate opening/closing detecting circuit 206, the ADF set detecting circuit 207, and the return switch 208 functioning as the detecting circuit 103 is operated, the detection signal is sent to the monitoring circuit 104. When the monitoring circuit 104 sends the output start signal to the DC power supply circuit 105, the DC power supply circuit 105 supplies the voltage output 1 to the controlling circuit 106, and the controlling circuit 106 switches the operational state of the image forming apparatus from the low-power consumption mode to the normal operation mode.

Figure 3:
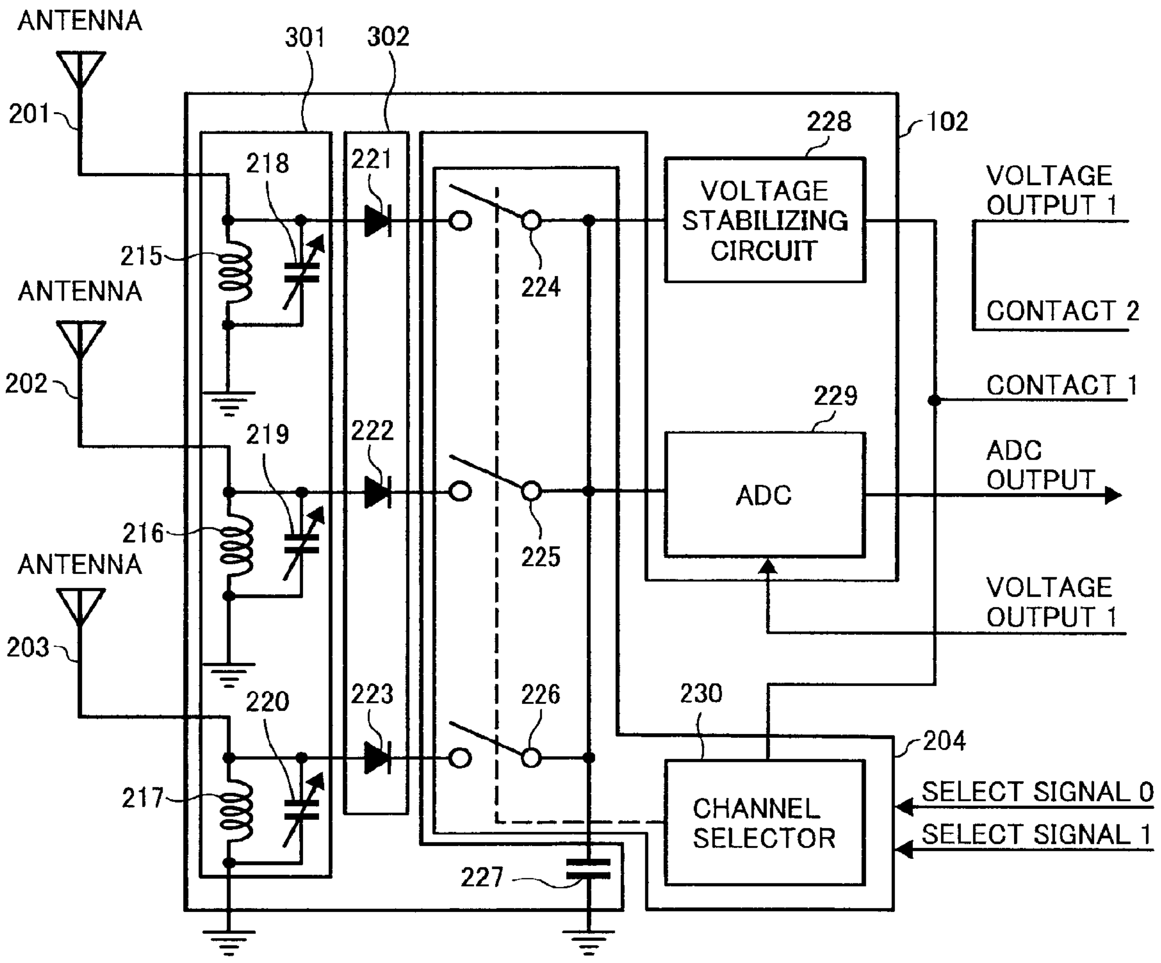
FIG. 3 is a circuit diagram of an electric wave power generation circuit and a selective circuit of the power supply unit shown in FIG. 1.

Next, the circuits are explained in detail. First, the electric wave power generation circuit 102 and the selecting circuit 204 are explained. FIG. 3 is a circuit diagram of the detailed configuration of the electric wave power generation circuit 102 and the selecting circuit 204 according to the present embodiment.

As shown in FIG. 3, the electric wave power generation circuit 102 includes the tuning circuit 301, the detector circuit 302, a capacitor 227, the voltage stabilizing circuit 228, and an AD converter (ADC) 229.

The antenna unit 101 including the antennas 201, 202, and 203 is connected to the tuning circuit 301. The tuning circuit 301 includes coils 215, 216, and 217 and capacitors 218, 219, and 220. The antennas 201, 202, and 203 are connected to the coils 215, 216, and 217, respectively. The antennas 201, 202, and 203 have the same tuning frequency. The antennas 201 is provided on the front cover of the image forming apparatus, the antennas 202 is provided on the side plate of the image forming apparatus, and the antennas 203 is provided on the pressure plate of the scanner.

The antennas 201, 202, and 203 may each have different tuning frequencies to be capable of generating power from various electrical waves.

The tuning circuit 301 is connected to the detector circuit 302. The detector circuit 302 includes diodes 221, 222, and 223. The electrical waves received by the antennas 201, 202, and 203 are converted into direct waves by the detector circuit 302 and are smoothed by the capacitor 227.

Since a change of the field intensity of the electrical waves in the living space due to an environment change influences the level of the generated voltage, the voltage stabilizing circuit 228 is provided to stabilize the voltage. The stabilized voltage output is supplied to the units as the voltage output 2 via the power switch circuit 109 when the power switch circuit 109 is on. When the power switch circuit 109 is off, the voltage output 2 is cut off.

The ADC 229 converts an analog voltage between terminals of the capacitor 227 into a digital value and sends the value to the controlling circuit 106.

As shown in FIG. 3, the selecting circuit 204 mainly includes a channel selector 230 and channel select switches 224, 225, and 226. The channel selector 230 selects one of the channel select switches 224, 225, and 226 based on a combination of select signals 0 and 1 (two bits) output from the controlling circuit 106. The channel selector 230 controls the switching action of the channel select switches 224, 225, and 226, and one of the direct voltage output terminals detected by the detector circuit 302 (the diodes 221, 222, and 223) is connected to the smoothing capacitor 227, the voltage stabilizing circuit 228, and the ADC 229 via the channel select switch 224, 225, and 226.

The controlling circuit 106 compares obtained digital values and selects the channel connected to the antenna supplying the highest voltage by sequentially switching the select signals 0 and 1. That is, the controlling circuit 106 uses the select signals to select one of the following three combinations: a first combination of the antenna 201, the coil 215, the capacitor 218, and the diode 221; a second combination of the antenna 202, the coil 216, the capacitor 219, and the diode 222; and a third combination of the antenna 203, the coil 217, the capacitor 220, and the diode 223. The selection is based on power generated by each of the combinations. Accordingly, the selecting circuit 204 selects the highest voltage generated from the electric waves received by the antennas 201, 202, and 203 and outputs electricity to the controlling circuit 106. Thus, the voltage output 2 can be supplied stably. The channel selector 230 is supplied with power from the voltage stabilizing circuit 228 so that the connection with a selected antenna can be maintained under the low-power consumption mode in which the voltage output 1 is cut off. Since the ADC 229 should operate only when selecting an antenna, the voltage output 1 is supplied thereto.

The configuration of the selecting circuit 204 is not limited to the above-described configuration. In the explanation, the selecting circuit 204 selects, and outputs to the controlling circuit 106, the highest voltage generated from the electric waves received by the antennas. However, since operating voltages of each circuit are generally fixed, applying electricity with excessively high voltage may break the circuit. To prevent this from happening, the selecting circuit 204 may be designed to select, and output to the controlling circuit 106, a voltage closest to a predetermined voltage level.

As explained above, according to the present embodiment, the sleep mode of the low-power consumption mode can be stably maintained by selecting the antenna with which the highest level of voltage as possible can be obtained using the selecting circuit 204 and stabilizing the voltage using the voltage stabilizing circuit 228.

Figure 4:
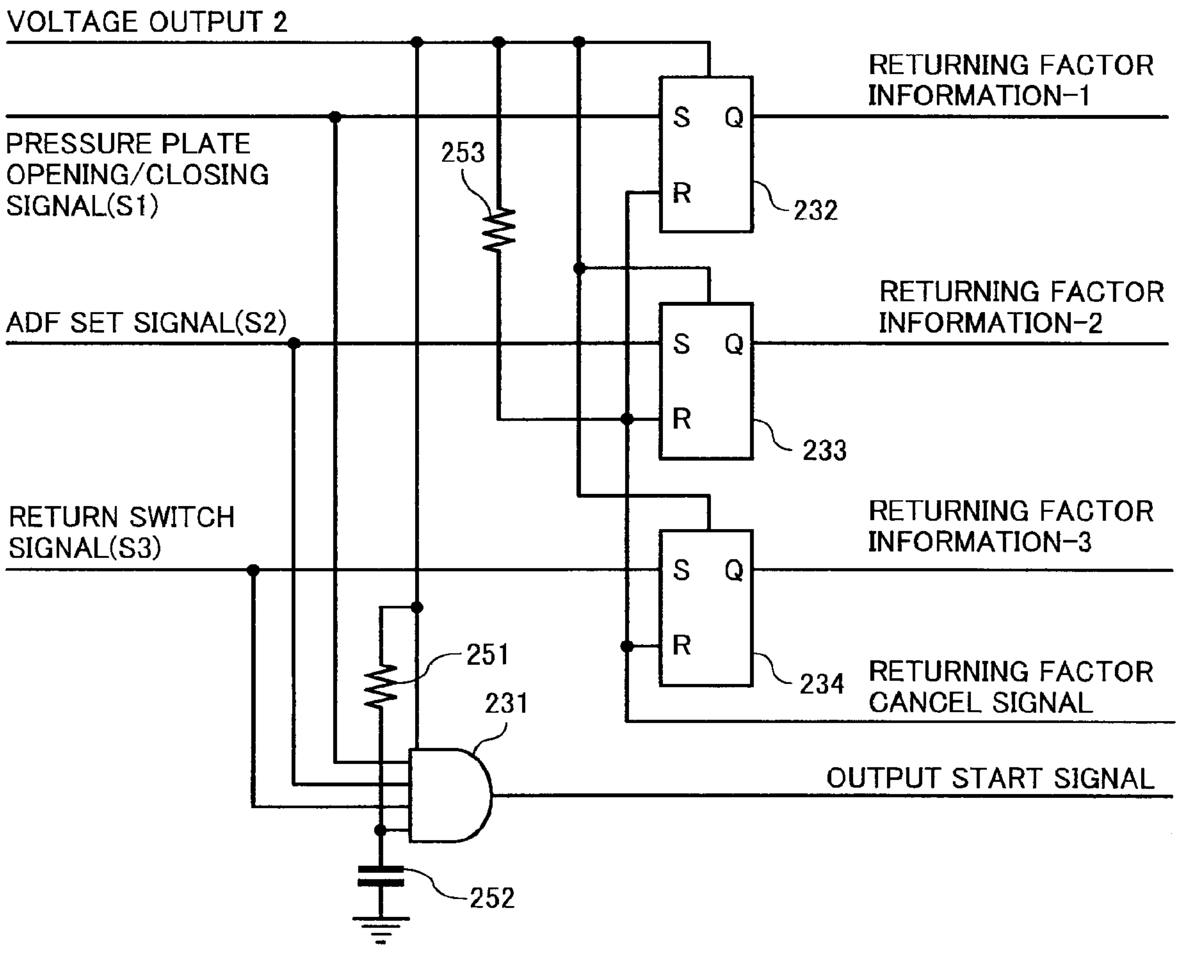
FIG. 4 is a circuit diagram of a monitoring circuit shown in FIG. 1.

Next, the monitoring circuit 104 is explained in detail. FIG. 4 is a circuit diagram of the detailed configuration of the monitoring circuit 104 according to the embodiment. As shown in FIG. 4, the monitoring circuit 104 mainly includes a 4-input AND circuit 231 (hereinafter, "AND circuit 231"), a capacitor 252, resistors 251 and 253, and flip-flops 232, 233, and 234.

Upon detecting an operation that is a returning factor, the pressure plate opening/closing detecting circuit 206, the ADF set detecting circuit 207, and the return switch 208 (see FIG. 2) generate a pressure plate opening/closing signal (S1), an ADF set signal (S2), and a return switch signal (S3), respectively, shown in FIG. 4. The signals are negative-logic signals and are input to the AND circuit 231. The AND circuit 231 functions as a negative-logic OR circuit and sends the output start signal to the DC power supply circuit 105 when any one of the pressure plate opening/closing signal, the ADF set signal, and the return switch signal is generated.

The CR time constant circuit includes the resistor 251 and the capacitor 252. When the apparatus is turned on, the power switch circuit 109 closes and the voltage output 2 is supplied to the AND circuit 231 and the resistor 251. The resistor 251 charges the capacitor 252. However, due to the capacitance of the resistor 251, the voltage of the input terminal of the AND circuit 231 connected to the capacitor 252 does not increase immediately. Therefore, the negative-logic signal is generated at the input terminal of the AND circuit 231 after a certain period of time after the power is on. The signal is sent to the DC power supply circuit 105 as the output start signal for the DC power supply circuit 105 to generate the voltage output 1.

The flip-flops 232, 233, and 234 operate as follows: when a signal in an S (set) terminal is in an L (low) level, an output Q is set to an H (high) level; and when a signal in an R (reset) terminal is in the H level, the output Q is set to the L (low) level. The pressure plate opening/closing signal, the ADF set signal, and the return switch signal (return SW signal) are connected to the S terminals of the flip-flops 232, 233, and 234, respectively. When the signals are in the low level, the output Q of a corresponding flip-flop becomes high level. Since the power source of the flip-flops 232, 233, and 234 is connected to the voltage output 2, the output Q is not cut off under the low-power consumption mode. The voltage outputs Q from each flip-flop are input to the controlling circuit 106 as a returning factor −1, a returning factor −2, and a returning factor −3, respectively. The controlling circuit 106 determines that a returning factor is generated by receiving any of these signals. The controlling circuit 106 can also determine which detecting circuit has operated by identifying the signals of the returning factor information.

Once the input of any of the returning factor information is completed in the controlling circuit 106, returning factor canceling signals are sent to the R terminals of each flip-flop and the output Q is back to the low level. When the voltage output 1 is not supplied and the controlling circuit 106 cannot output the returning factor canceling signals, the input level of the R terminals becomes unstable. Thus, the resistor 253 is connected to the R terminals of each flip-flops to set the R terminals to high level for the flip-flops to operate normally.

Figure 5:
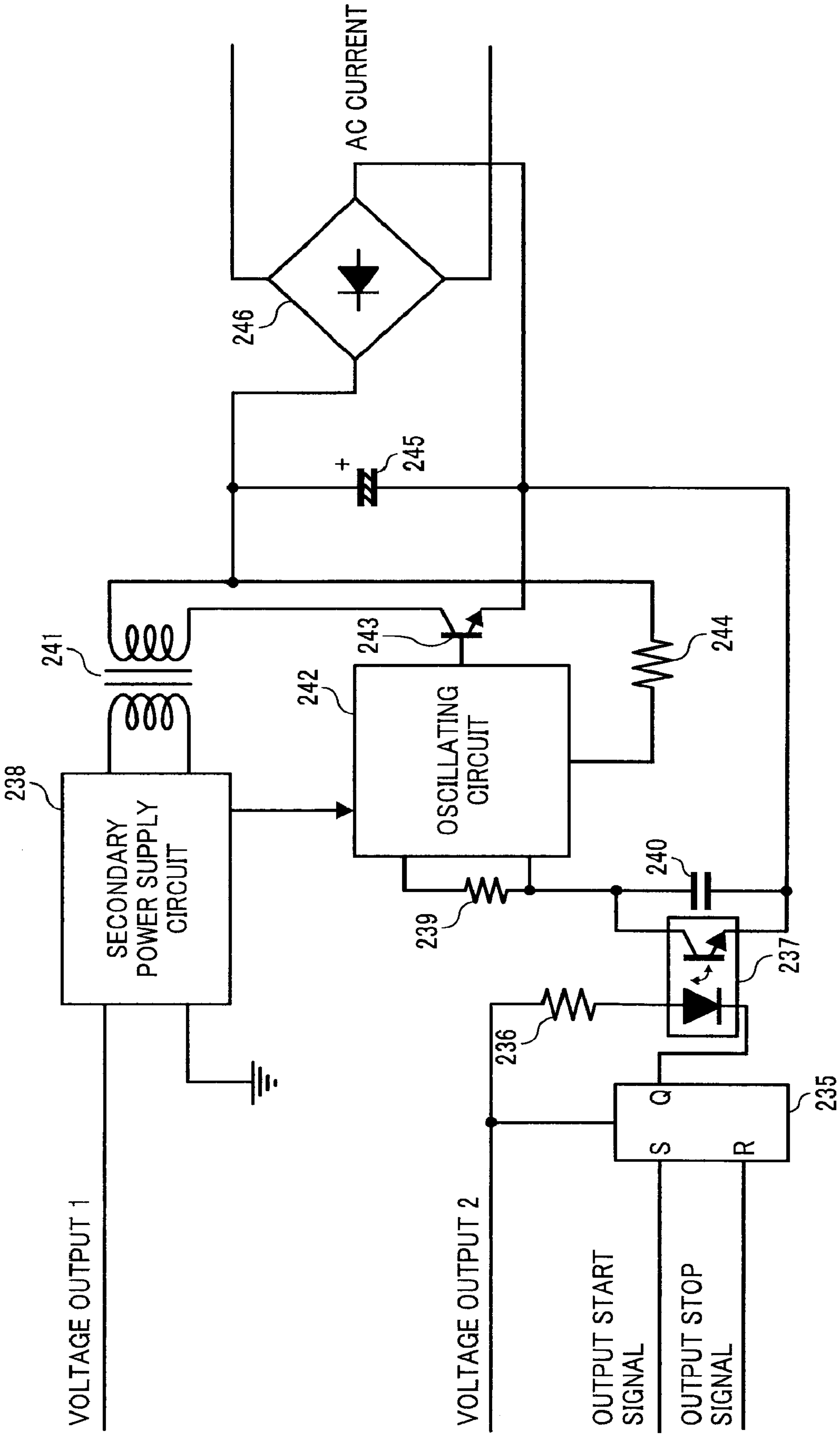
FIG. 5 is a circuit diagram of a DC power supply circuit shown in FIG. 1.

Next, the DC power supply circuit 105 is explained in detail. FIG. 5 is a circuit diagram of a detailed configuration of the DC power supply circuit 105 according to the present embodiment. As shown in FIG. 5, the DC power supply circuit 105 includes a secondary power supply circuit 238, a transformer 241, an oscillation circuit 242, a transistor 243, a flip-flop 235, a photo coupler 237, capacitors 240 and 245, resistors 236, 239, and 244, and a diode bridge 246.

In FIG. 5, a voltage input from the AC power source is rectified into a pulsed voltage output by the diode bridge 246. The pulsed voltage output is smoothed by the capacitor 245 and a DC voltage is generated between terminals of the capacitor 245. A voltage on one of the terminals of the capacitor 245 is connected to one end of a primary coil of the transformer 241. The other end of the primary side coil is connected to a collector of the transistor 243. An emitter of the transistor 243 is connected to the other terminal of the capacitor 245. A base of the transistor 243 is supplied with a pulsed driving current from the oscillation circuit 242. When the pulsed driving current flows in the primary coil of the transformer 241 by switching on and off the transistor 243, a voltage corresponding to a turn ratio of a secondary side coil of the transformer 241 is generated and supplied to the secondary power supply circuit 238.

The voltage output 1 is generated in the secondary power supply circuit 238 by the rectifying circuit and a smoothing circuit not shown. The secondary power supply circuit 238 outputs a voltage V1' that is generated by dividing the voltage output 1 to the oscillating circuit 242. In the oscillating circuit 242, the voltage is used as a feedback voltage to control the oscillation and the voltage of the voltage output 1 is stabilized by changing the duty rate of the pulsing driving current for driving the transistor 243. As the feedback voltage needs to be insulated from the AC power side, the feedback voltage is sent from the secondary power supply circuit 238 to the oscillating circuit 242 being insulated by the photo coupler 237 or the like.

The resistor 244 is for reducing the voltage from the capacitor 240 to obtain low voltage suitable for operating the oscillating circuit 242. The resistor 239 and the capacitor 240 are time constant circuits for CR oscillation. The resistor 239 charges the capacitor 240. When the voltage of the capacitor 240 reaches a certain upper limit, the voltage is dropped by a discharge circuit not shown. When the voltage drops to a certain lower limit, the capacitor 240 is charged again. By repeating the process, a sawtooth voltage can be obtained at the terminal of the oscillating circuit 242 connected with the capacitor 240.

A pulsing waveform can be obtained by comparing the sawtooth voltage with an arbitrary voltage between the upper and the lower limit using a comparator circuit not shown. By changing the arbitrary voltage, the duty rate of the pulsing waveform can be changed. The voltage output 1 is stabilized by comparing the sawtooth wave with the feedback voltage from the secondary power supply circuit 238 as the arbitrary voltage by the comparator circuit. Thus, if the feedback voltage increases due to an increase in the voltage output 1, the duty rate of the pulsing waveform obtained by comparing with the range of the sawtooth wave becomes narrow, and as a result, the voltage output 1 is modified to a lower voltage.

The photo coupler 237 is capable of stopping the oscillation of the oscillating circuit 242 by turning on a transistor provided therein to short circuit the capacitor 240 for the CR oscillation. If the oscillating circuit 242 stops oscillating, no voltage is generated in the secondary side coil of the transformer 241. As a consequence, the voltage output 1 is cut off and the apparatus enters the low-power consumption mode (the sleep mode).

When the output stop signal is sent to the R (reset) terminal of the flip-flop 235, the output Q turns to low level. Then, electricity is applied to the LED of the photo coupler 237 from the voltage output 2 through the resistor 236 and the transistor of the photo coupler 237 turns on. By turning on transistor of the photo coupler 237, the capacitor 240 is short circuited and the oscillating circuit 242 stops oscillating.

Here, if the output start signal is sent to the S (set) terminal of the flip-flop 235, the output Q becomes high level. Then, electricity is not applied to the LED of the photo coupler 237 from the voltage output 2 and the transistor of the photo coupler 237 turns off. By turning off the transistor of the photo coupler 237, the capacitor 240 is opened and the oscillating circuit 242 operates normally.

As explained above, since the voltage output 1 from the DC power supply circuit 105 can be stopped readily by stopping the oscillation of the oscillating circuit 242, the consumption of the commercial AC power supply under the low-power consumption mode can be reduced to almost zero.

As explained above, the power supply of the present embodiment supplies power needed when the image forming apparatus is in the low-power consumption mode with the electric wave power generation using electrical waves in the living space emitted from a radio, a television set, or the like. Thus, the power source in the low-power consumption mode can be configured without a storage battery, the low-power consumption mode can be maintained unlimitedly, and power consumption of the commercial AC power supply can be reduced to almost zero.

Figure 6:
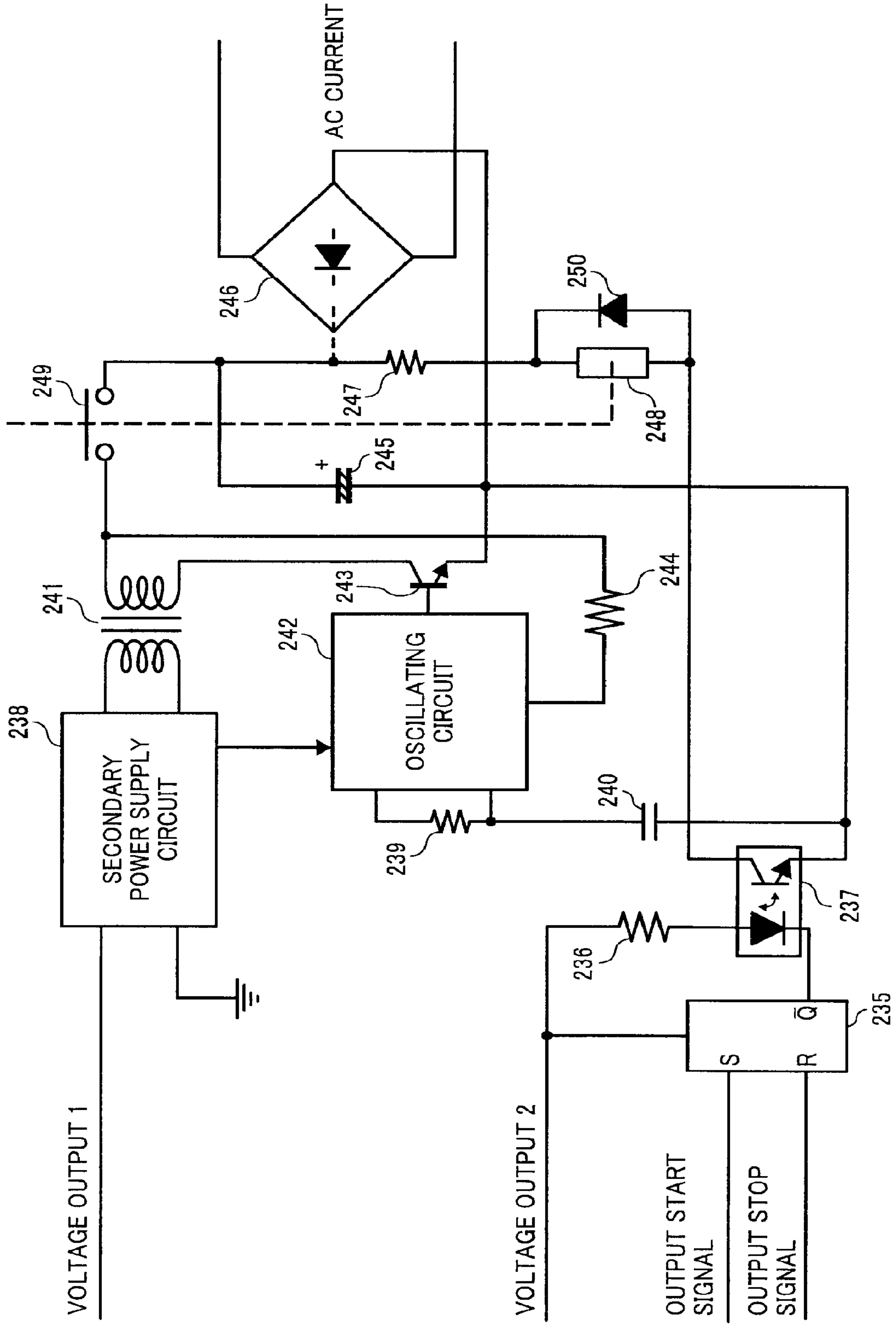
FIG. 6 is a circuit diagram of another example of the DC power supply circuit shown in FIG. 1.
Figure 7:
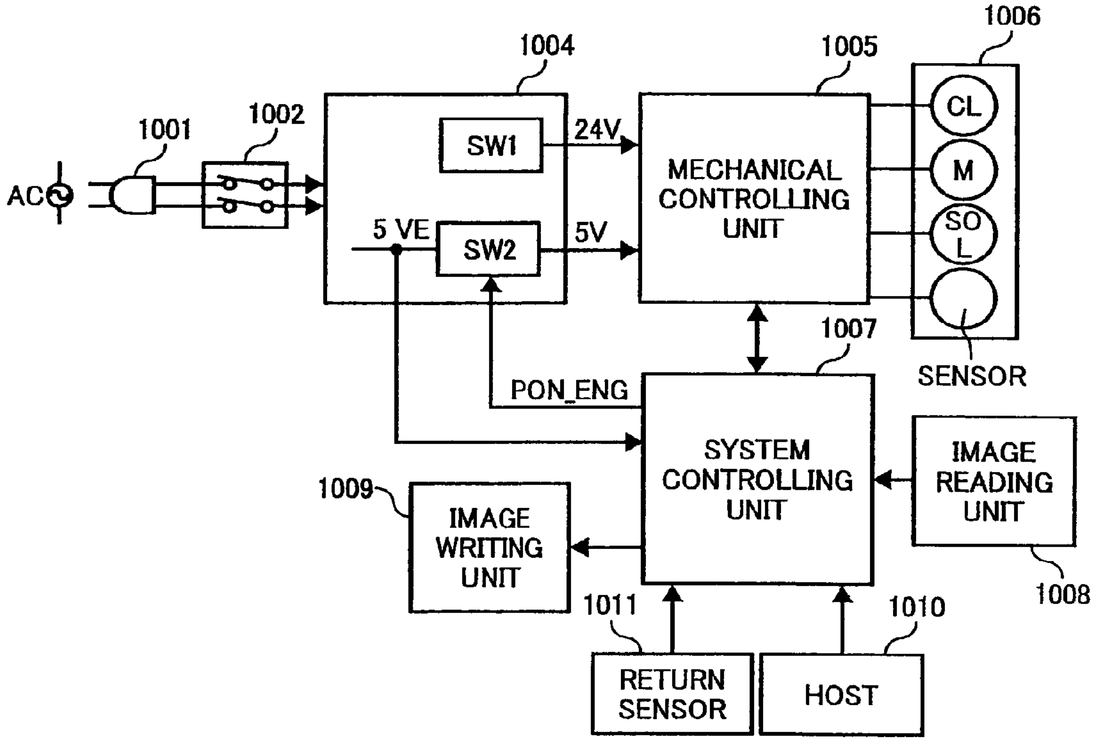
FIG. 7 Background Art
FIG. 7 is a block diagram of a conventional image forming apparatus.
Figure 8:
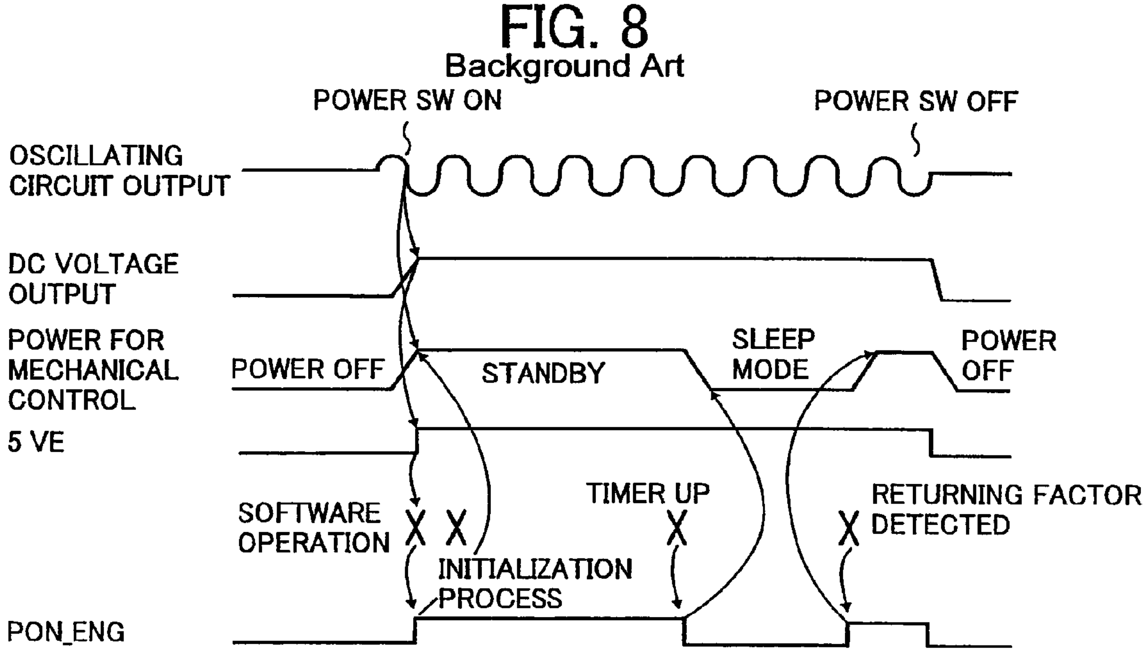
FIG. 8 Background Art
FIG. 8 is a timing chart of operations of the image forming apparatus shown in FIG. 7.
Figure 9:
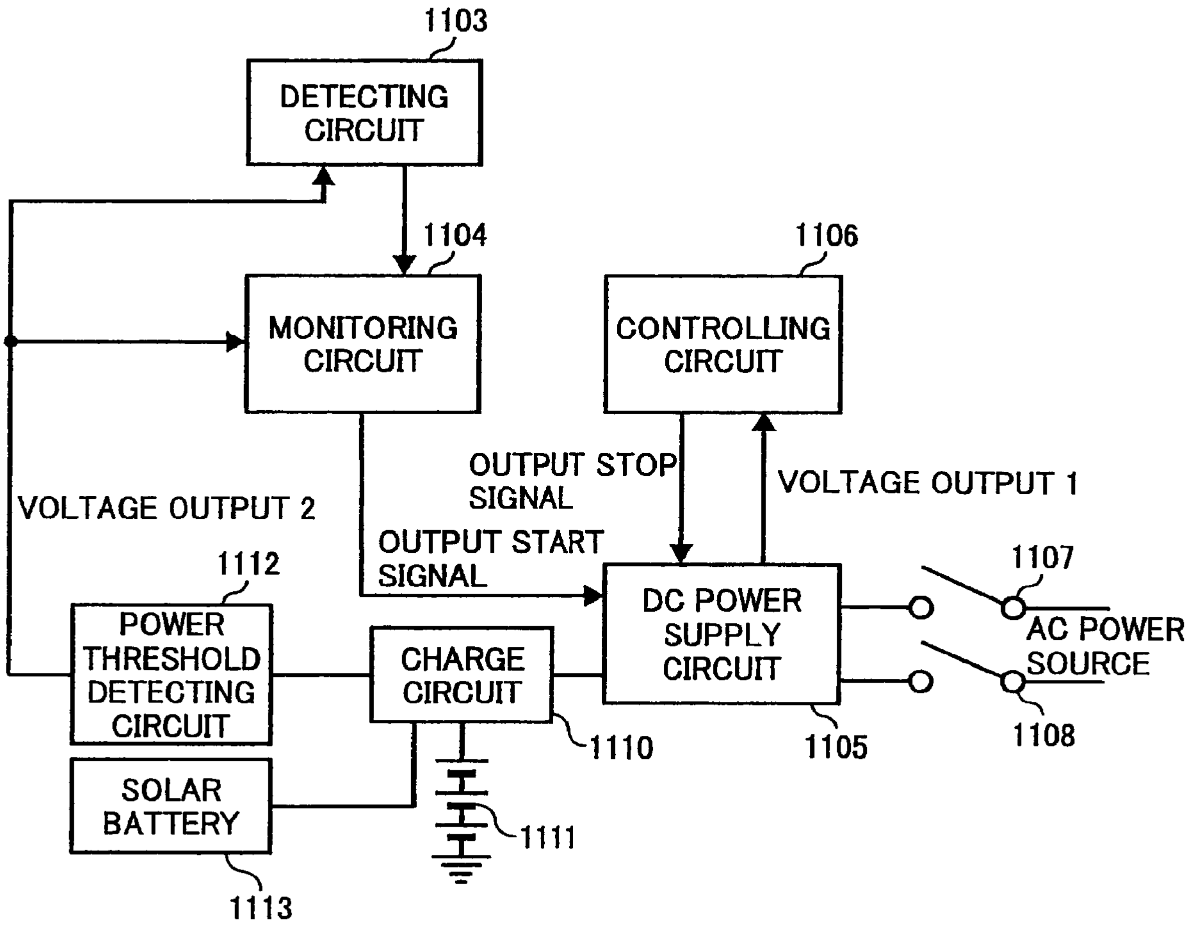
FIG. 9 Background Art
FIG. 9 is a block diagram of a conventional power supply unit using a solar battery.

Next, a modification of the DC power supply circuit 105 is explained in detail. FIG. 6 is a circuit diagram of a configuration of the DC power supply circuit 105 according to the modification. Only the points in FIG. 6 different from that of the circuit in FIG. 5 are explained in detail.

As in FIG. 5, when the output start signal is sent to the S (set) terminal of the flip-flop 235, an output Q− (an inverted output of the output Q) becomes low level. Then, electricity is applied to the LED of the photo coupler 237 from the voltage output 2 through the resistor 236 and the transistor in the photo coupler 237 turns on. When the transistor in the photo coupler 237 is on, in the modification, electricity is applied to an exciting coil of a relay 248 from a high voltage side of the capacitor 245 through a resistor 247 and a relay contact network 249 is connected. When the relay contact network 249 is connected, as in the circuit in FIG. 5, a pulsed current flows in the primary coil of the transformer 241 by switching on and off the transistor 243, a voltage corresponding to a turn ratio of a secondary side coil of the transformer 241 is generated, whereby the DC power supply circuit 105 generates the voltage output 1. The resistor 247 is for dropping the voltage to the exciting coil of the relay 248, and a diode 250 is for preventing noise from the relay 248 under operation.

When the output stop signal is sent to the R (reset) terminal of the flip-flop 235, the output Q− becomes high level and the transistor in the photo coupler 237 is turned off as the LED of the photo coupler 237 receives no electricity. When the transistor of the photo coupler 237 is turned off, the exciting coil of the relay 248 also receives no electricity and the relay contact network 249 is opened. If the relay contact network 249 is opened, the DC power supply circuit 105 stops generating the voltage output 1 as power is not supplied to the oscillating circuit 242 and the transformer 241.

As explained above, the modification is preferable in that the voltage output 1 from the DC power supply circuit 105 can be stopped by cutting off the power supply to the oscillation circuit 242 and the transformer 241 using the relay 248. In addition, consumption of the commercial AC power supply under the low-power consumption mode is smaller than using the circuit in FIG. 5 to stop the oscillation and can be reduced to almost zero.

In the explanation, the image forming apparatus such as a copier, a printer, a facsimile, a scanner, a multi-function printer was exemplified as an apparatus subjected to power supply (the apparatus supplied with power from the power supply unit). However, the apparatus provided with power from the power supply unit is not limited to the image forming apparatus and the power supply unit can be applied to a wide range of apparatuses in general having the low-power consumption mode.

Further, in the embodiment, the antenna unit 101 (the antennas 201, 202, and 203) receives electrical wave from a radio, television, and the like in the living space. However, the present invention is not limited thereto and the antenna unit 101 may be a radio frequency identification (RFID) receiver that receives electrical wave from an RFID tag with ID and the like mounted thereon. In this case, the power supply unit of the present embodiment is provided to the RFID receiver (the RFID reader/writer), and supplies power thereto.

The present invention is not limited to the embodiments above and the components can be modified without departing from the scope of the invention. In addition, by properly combining the components disclosed in the embodiments, various inventions can be formed. For example, some of the components shown in the embodiments can be omitted. Further, components from the different embodiments can be properly combined.

With the present invention, energy saving in the power supply control for reducing the amount of power consumption when an apparatus is not operating can be facilitated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply unit, comprising:

a power supply circuit;

a first switch to connect a main power source to the power supply circuit;

a controlling unit configured to switch an operational state of an apparatus between an operating mode in which the power supply circuit supplies a first-level power to the apparatus and a power-saving mode in which the power supply circuit supplies a second-level power that is lower than the first-level power to the apparatus;

a monitoring unit that monitors whether a returning factor required to switch the operational state of the apparatus from the power-saving mode to the operating mode is generated;

an antenna unit that receives external electrical waves;

a power generation unit that includes a tuning circuit connected to the antenna unit so as to generate electricity from the electrical waves received by the antenna unit and supplies the electricity to the power supply circuit and to the monitoring unit; and a second switch to switch the power generation unit between a state in which the power generation unit supplies the electricity, and a state in which the power generation unit stops supplying the electricity, the second switch being open or closed in unison with the first switch, wherein the second switch is open when the first switch is open and the main power source is not supplied to the power supply circuit, causing the power generation unit to stop supplying electricity to the power supply circuit and the monitoring unit; and the controlling unit switches the operational state of the apparatus from the power-saving mode to the operating mode when the monitoring unit detects generation of a returning factor.

2. The power supply unit according to claim 1, further comprising a detecting unit that detects an operation of the apparatus, wherein the monitoring unit determines whether the returning factor is generated based on the operation detected by the detecting unit.

3. The power supply unit according to claim 2, wherein the power generation unit supplies the electricity to the detecting unit while the apparatus is in the power-saving mode.

4. The power supply unit according to claim 1, wherein the antenna unit includes a plurality of antennas that receive the electrical waves, and the power generation unit includes a power generation unit that generates a plurality of different voltages from the electrical waves received by each of the antennas; and a selecting unit that selects one of the voltages generated in the power generating unit and supplies the selected voltage to the monitoring unit.

5. The power supply unit according to claim 4, wherein the selecting unit selects the highest voltage.

6. The power supply unit according to claim 4, wherein each of the antennas receives electrical waves from a different direction.

7. The power supply unit according to claim 4, wherein each of the antennas receives electrical waves with a same tuning frequency.

8. The power supply unit according to claim 4, wherein each of the antennas receives electrical waves with different tuning frequencies.

9. An image forming apparatus, comprising:

at least one of a printer engine and a scanner engine; and a power supply unit, the power supply unit including a power supply circuit;

a first switch to connect a main power source to the power supply circuit;

a controlling unit configured to switch an operational state of the image forming apparatus between an operating mode in which the power supply circuit supplies a first-level power to the image forming apparatus and a power-saving mode in which the power supply circuit supplies a second-level power that is lower than the first-level power to the image forming apparatus;

a monitoring unit that monitors whether a returning factor required to switch the operational state of the image forming apparatus from the power-saving mode to the operating mode is generated;

an antenna unit that receives external electrical waves;

a power generation unit that includes a tuning circuit connected to the antenna unit so as to generate electricity from the electrical waves received by the antenna unit and supplies the electricity to the power supply circuit and to the monitoring unit; and a second switch to switch the power generation unit between a state in which the power generation unit supplies the electricity, and a state in which the power generation unit stops supplying the electricity, the second switch being open or closed in unison with the first switch, wherein the second switch is open when the first switch is open and the main power source is not supplied to the power supply circuit, causing the power generation unit to stop supplying electricity to the power supply circuit and the monitoring unit; and the controlling unit switches the operational state of the image forming apparatus from the power-saving mode to the operating mode when the monitoring unit detects generation of a returning factor.

10. The image forming apparatus according to claim 9, further comprising a detecting unit that detects an operation of the image forming apparatus, wherein the monitoring unit determines whether the returning factor is generated based on the operation detected by the detecting unit.

11. The image forming apparatus according to claim 10, wherein the detecting unit includes a plate detecting unit that detects opening/closing of a pressure plate, and the monitoring unit determines that the returning factor is generated when the plate detecting unit detects that the pressure plate is opened.

12. The image forming apparatus according to claim 10, further comprising an automatic document reading unit, wherein the detecting unit includes an original detecting unit that detects whether an original is present on the automatic document reading unit, and the monitoring unit determines that the returning factor is generated when the original detecting unit detects that the original is present on the automatic document reading unit.

13. The image forming apparatus according to claim 10, further comprising a return switch that a user pushes to instruct the image forming apparatus to return to the operating mode, wherein the detecting unit includes a switching detecting unit that detects whether the return switch is operated, and the monitoring unit determines that the returning factor is generated when the switching detecting unit detects that the return switch is operated.

14. A method for controlling power supply to an apparatus from a power supply circuit, the method comprising:

supplying power to the power supply circuit via a first switch that connects a main power source to the power supply circuit;

monitoring, with a monitoring unit, whether a returning factor required to switch an operational state of the apparatus between a power-saving mode and an operating mode is generated, the operating mode being a state in which the power supply circuit supplies a first-level power to the apparatus and the power-saving mode being a state in which the power supply circuit supplies a second-level power that is lower than the first-level power to the apparatus;

generating, by a power generation unit including a tuning circuit connected to an antenna unit, electricity from electrical waves received at the antenna unit;

supplying the electricity generated in the generating step to the power supply circuit and to the monitoring unit, wherein the supplying step includes not supplying the electricity to the monitoring unit when no power is being supplied to the apparatus;

switching the power generation unit via a second switch between a state in which the power generation unit supplies the electricity, and a state in which the power generation unit stops supplying the electricity, the second switch being open or closed in unison with the first switch, wherein the second switch is open when the first switch is open and the main power source is not supplied to the power supply circuit, causing the power generation unit to stop supplying electricity to the power supply circuit and the monitoring unit; and switching the operational state of the apparatus from the power-saving mode to the operating mode when the monitoring unit detects generation of the returning factor.

15. The method according to claim 14, further comprising detecting, by a detecting unit, an operation of the apparatus, wherein the monitoring step includes determining whether the returning factor is generated based on the operation detected in the detecting step.

16. The method according to claim 15, wherein the supplying step includes supplying the electricity to the detecting unit while the apparatus is in the power-saving mode.

17. The method according to claim 14, wherein the antenna unit includes a plurality of antennas that receive the electrical waves, and the generating step includes generating a plurality of different voltages from the electrical waves received by each of the antennas; and selecting one of the voltages generated in the generating step.

18. The method according to claim 17, wherein the selecting includes selecting the highest voltage.

* * * * *